US009788249B2

(12) United States Patent
Iimori

(10) Patent No.: US 9,788,249 B2
(45) Date of Patent: Oct. 10, 2017

(54) WIRELESS COMMUNICATION APPARATUS, WIRELESS COMMUNICATION METHOD, AND COMPUTER-READABLE RECORDING MEDIUM

(71) Applicant: FUJITSU LIMITED, Kawasaki-shi, Kanagawa (JP)

(72) Inventor: Eiji Iimori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 224 days.

(21) Appl. No.: 14/672,428

(22) Filed: Mar. 30, 2015

(65) Prior Publication Data

US 2015/0289183 A1  Oct. 8, 2015

(30) Foreign Application Priority Data

Apr. 8, 2014  (JP) ................. 2014-079769

(51) Int. Cl.
| | |
|---|---|
| *H04W 36/14* | (2009.01) |
| *H04W 36/30* | (2009.01) |
| *H04W 48/18* | (2009.01) |
| *H04W 88/06* | (2009.01) |
| *H04W 72/12* | (2009.01) |

(Continued)

(52) U.S. Cl.
CPC ........... *H04W 36/14* (2013.01); *H04W 36/30* (2013.01); *H04W 48/18* (2013.01); *H04W 88/06* (2013.01); *H04W 24/00* (2013.01); *H04W 72/1215* (2013.01); *H04W 72/1247* (2013.01); *H04W 84/12* (2013.01); *H04W 84/18* (2013.01)

(58) Field of Classification Search
CPC ...... H04W 36/14; H04W 88/06; H04W 48/18; H04W 36/30; H04W 72/1247; H04W 84/12; H04W 72/1215; H04W 84/18; H04W 24/00
See application file for complete search history.

(56) References Cited

U.S. PATENT DOCUMENTS 9,055,556 B2 *  6/2015  Wietfeldt ............... H04W 72/02
9,072,077 B2 *  6/2015  Wietfeldt ............... H04W 72/02
(Continued)

FOREIGN PATENT DOCUMENTS

| EP | 1401162 A2 | 3/2004 |
|---|---|---|
| JP | 2008-136150 | 6/2008 |
| JP | 2011-166251 | 8/2011 |

OTHER PUBLICATIONS

EESR—The Extended European Search Report of European Patent Application No. 15159630.1, dated Sep. 1, 2015.

Primary Examiner — Brian O'Connor
(74) Attorney, Agent, or Firm — Fujitsu Patent Center

(57) ABSTRACT

A wireless communication apparatus allocates data to a first communication network and a second communication network and performs wireless communication. In this state, the wireless communication apparatus determines the first communication network or the second communication network to be a communication network available for an application, on the basis of the radio quality of the first communication network, the radio quality of the second communication network, and a type of the application. Then, the wireless communication apparatus notifies the application of network information for specifying the determined available communication network.

8 Claims, 11 Drawing Sheets

(51) Int. Cl.
*H04W 84/18* (2009.01)
*H04W 84/12* (2009.01)
*H04W 24/00* (2009.01)

(56) References Cited

U.S. PATENT DOCUMENTS

| | | |
|---|---|---|
| 2013/0121145 A1 | 5/2013 | Draznin et al. |
| 2013/0229270 A1 | 9/2013 | Srinivasan et al. |
| 2014/0071895 A1 | 3/2014 | Bane et al. |
| 2014/0321376 A1* | 10/2014 | Damnjanovic ... H04W 72/1215 370/329 |
| 2014/0328177 A1* | 11/2014 | Zhao ................... H04W 28/08 370/235 |
| 2016/0029249 A1* | 1/2016 | Chou ................... H04L 5/0085 370/338 |
| 2016/0234711 A1* | 8/2016 | Wang ................ H04L 61/2592 |

\* cited by examiner

| APPLICATION NAME | IDENTIFIER (UID) |
|---|---|
| APPLICATION A | W |
| APPLICATION C | Y |
| APPLICATION D | Z |
| ... | ... |

WIRELESS COMMUNICATION APPARATUS, WIRELESS COMMUNICATION METHOD, AND COMPUTER-READABLE RECORDING MEDIUM

CROSS-REFERENCE TO RELATED APPLICATION

This application is based upon and claims the benefit of priority of the prior Japanese Patent Application No. 2014-079769, filed on Apr. 8, 2014, the entire contents of which are incorporated herein by reference.

FIELD

The embodiments discussed herein are related to a wireless communication apparatus, a wireless communication method, and a wireless communication program.

BACKGROUND

The user of a wireless communication terminal provided with a plurality of wireless systems can select a wireless system suitable for various situations and can use the selected wireless system. Therefore, user convenience is improved. In addition, communication network operators can distribute a data communication load to various wireless systems, which promotes the construction of multi-wireless systems in terminals or PCs.

In order to improve user convenience, the following method is generally used: a plurality of multi-wireless systems are not manually selected and used, but a plurality of wireless systems are constantly turned on and are automatically switched. For the switching of wireless connections, a wireless system different from the wireless system which is currently used for communication is periodically searched for and a connection thereto is checked. A search method varies depending on the service coverage of each wireless system.

For example, a cellular network, such as a long term evolution (LTE) network, has a wide support range and a wireless local area network (LAN) system, such as a wireless fidelity (Wi-Fi (registered trademark)) system, has a narrow support range. Therefore, the wireless communication terminal normally performs communication with the cellular network. When a wireless LAN is detected, the wireless communication terminal performs a control process of switching the communication network from the cellular network to the wireless LAN even though communication is continuously performed using the cellular network.

For example, the advantage of communication using the wireless LAN is that there is no charge for communication packets or the user can benefit from high-speed communication with a data transmission rate greater than 100 Mbps. Telecommunications carriers make a policy of performing communication using the wireless LAN as much as possible when traffic congestion occurs in the cellular network.

The disadvantage of communication using the wireless LAN is that there is a large variation in communication quality and only low-speed communication is performed depending on the degree of congestion or the communication band of the backbone of the access point. When the wireless communication terminal is in this state, the user manually switches the wireless LAN connection to the cellular network or continuously uses a weak wireless LAN until communication is disconnected.

In recent years, a simultaneous communication method which uses the cellular network and the wireless LAN at the same time has been used. This method constantly monitors the two wireless systems. Therefore, it is possible to perform control such that the wireless system with higher communication quality is used as much as possible.

Patent Document 1: Japanese Laid-open Patent Publication No. 2008-136150

Patent Document 2: Japanese Laid-open Patent Publication No. 2011-166251

However, in the simultaneous communication method, in some cases, an application installed in the wireless communication terminal performs an unintended operation. For example, some of the applications installed in the wireless communication terminal recognize whether the wireless communication terminal is connected to the wireless LAN or the cellular network and determine the operation mode on the basis of the recognition result.

For example, there is a preload function in which a browser application reads a linked site from a site first in order to display content at high speed. When the preload function is performed, a large amount of data is transmitted. Therefore, the browser application performs the preload function only when the wireless LAN is used, considering a communication charge.

However, when the simultaneous communication function is performed, it is difficult for the browser application to specify the wireless system for communication. Therefore, in some cases, the browser application performs the preload function, with the wireless communication terminal connected to the cellular network, which results in an unintended charge. As such, in the simultaneous communication method, in some cases, the application installed in the wireless communication terminal performs an unintended operation, which creates a disadvantage for the user.

SUMMARY

According to an aspect of the embodiment, a wireless communication apparatus includes a memory; and a processor that is connected to the memory, wherein the processor executes a process. The process includes determining, while data is allocated to a first communication network and a second communication network and wireless communication is executed, the first communication network or the second communication network to be a communication network available for an application, on the basis of the radio quality of the first communication network, the radio quality of the second communication network, and a type of the application; and notifying the application of network information for specifying the available communication network determined at the determining.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The invention is not limited to the embodiments.

[a] First Embodiment

Overall Structure

Figure 1:
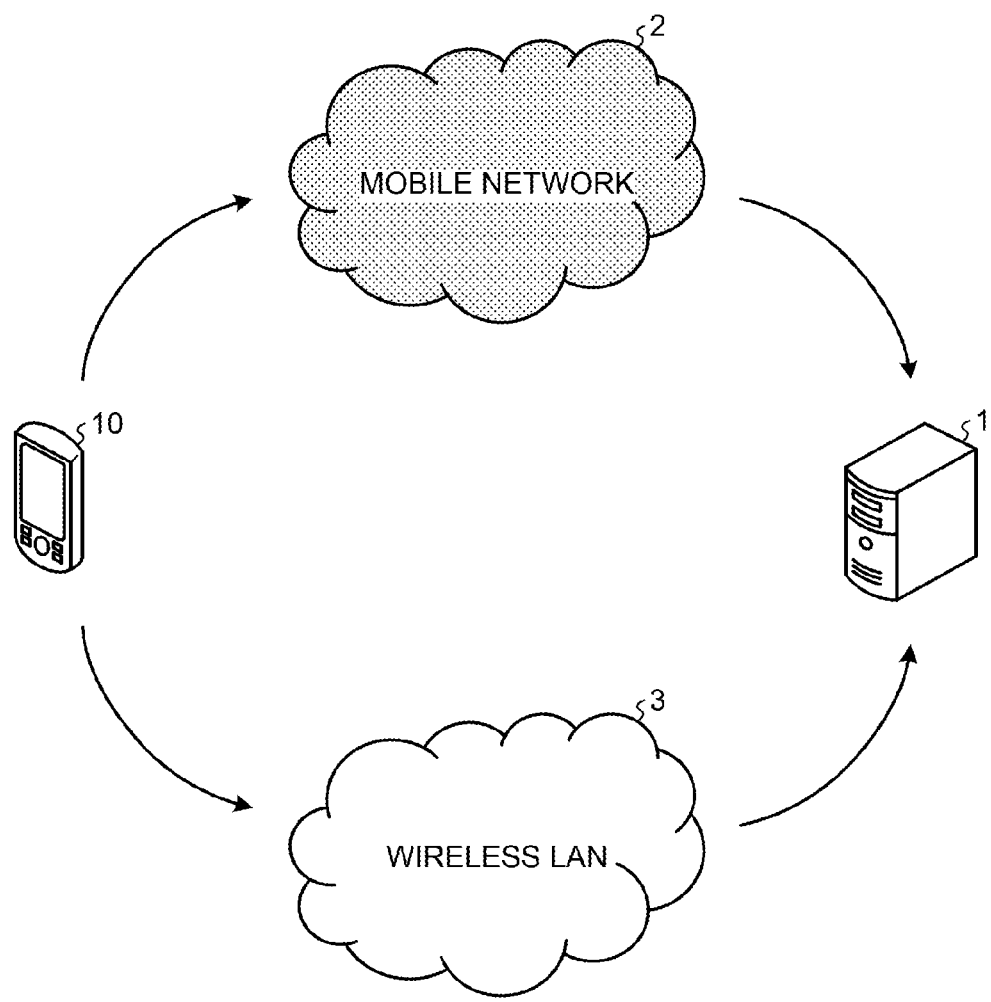
FIG. 1 is a diagram illustrating an example of the overall structure of a system according to a first embodiment.

FIG. 1 is a diagram illustrating an example of the overall structure of a system according to a first embodiment. As illustrated in FIG. 1, in the system, a mobile terminal 10 and a Web server 1 are connected so as to communicate with each other through a mobile network 2 and a wireless LAN 3. In this embodiment, the mobile terminal 10 communicates with the Web server 1. However, the communication destination of the mobile terminal 10 is not particularly limited by the embodiment.

An example of the mobile network 2 is an LTE network or a 3G network and an example of the wireless LAN 3 is a Wi-Fi network or a worldwide interoperability for microwave access (WiMAX) network. For example, the number of apparatuses is an illustrative example and is not particularly limited. In this embodiment, an example in which the Wi-Fi network and the LTE network are used will be described.

The Web server 1 is a server apparatus that provides Web services to a client. The Web server 1 performs user authentication for a client terminal and provides various Web services to the authenticated client terminal.

The mobile terminal 10 is a client terminal that executes applications to communicate with the Web server 1 and is, for example, a smart phone, a mobile phone, or a notebook personal computer.

The mobile terminal 10 includes antennas corresponding to each communication network and can perform communication using the communication networks at the same time. For example, the mobile terminal 10 determines an allocation ratio on the basis of the quality of the Wi-Fi network and the quality of the LTE network, allocates packets to the Wi-Fi network and the LTE network at the determined ratio, and performs wireless communication.

The mobile terminal 10 can allocate packets in a socket unit. For example, the mobile terminal 10 determines the ratio of the Wi-Fi network to the LTE network to be 7:3 in an environment in which the quality of the Wi-Fi network is higher than that of the LTE network. In this case, the mobile terminal 10 transmits data through a Wi-Fi channel using seven sockets and transmits data through an LTE channel using three sockets, among 10 sockets used for an application A.

That is, the mobile terminal 10 establishes a connection to the Wi-Fi network, using a Wi-Fi internet protocol (IP) and a port number used by the application A, and the Wi-Fi IP address of the Web server 1 and the port number used by the application A. Then, the mobile terminal 10 opens the sockets and writes data to the sockets such that the Web server 1 reads the data. The Web server 1 returns a request from the mobile terminal 10 and the mobile terminal 10 receives data using the sockets. When the communication between the mobile terminal 10 and the Web server 1 is completed, the mobile terminal 10 closes the sockets. The mobile terminal 10 performs communication using seven Wi-Fi sockets among a total of 10 sockets to transmit data.

The mobile terminal 10 establishes a connection to the LTE network, using an LTE IP address and the port number used by the application A, and the LTE IP address of the Web server 1 and the port number used by the application A. Then, the mobile terminal 10 opens the sockets and writes data to the sockets such that the Web server 1 reads the data. The Web server 1 returns a request from the mobile terminal 10 and the mobile terminal 10 receives the data using the sockets. When the communication between the mobile terminal 10 and the Web server 1 is completed, the mobile terminal 10 closes the sockets. The mobile terminal 10 performs communication using three LTE sockets among a total of 10 sockets to transmit data.

As such, the mobile terminal 10 allocates data to the Wi-Fi network and the LTE network and performs wireless communication using the two networks at the same time. In this state, the mobile terminal 10 determines the Wi-Fi network or the LTE network to be an available communication network for the application, on the basis of the radio quality of the Wi-Fi network and the radio quality of the LTE network, and the type of application. Then, the mobile terminal 10 notifies the application of network information indicating the determined available communication network.

For example, the mobile terminal 10 makes a browser application recognize that the mobile terminal is connected to the LTE network when communication is performed using the Wi-Fi network and the LTE network at the same time and makes the browser application recognize that the mobile terminal is connected to the Wi-Fi network when communication is performed using only the Wi-Fi network. In this way, the mobile terminal 10 prevents the occurrence of an error in the application, such as a charge caused by simultaneous communication.

Hardware Configuration

Figure 2:
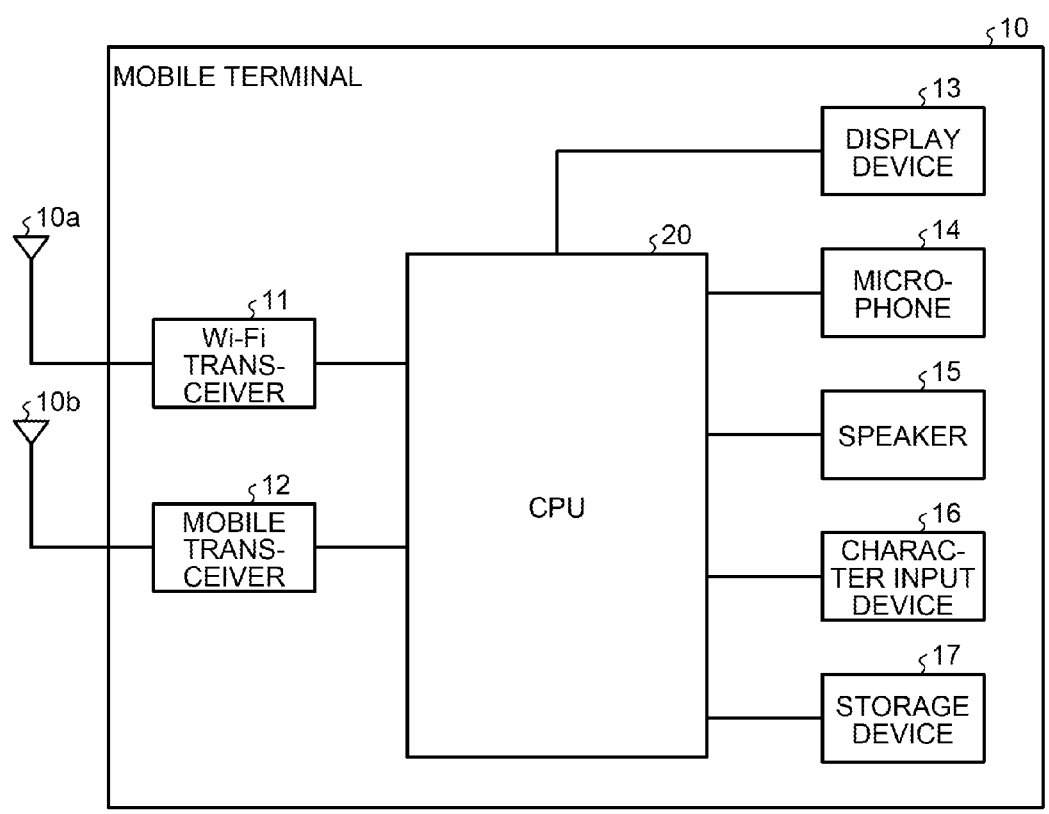
FIG. 2 is a diagram illustrating an example of the hardware configuration of a mobile terminal according to the first embodiment.

FIG. 2 is a diagram illustrating an example of the hardware configuration of the mobile terminal according to the first embodiment. As illustrated in FIG. 2, the mobile terminal 10 includes a Wi-Fi transceiver 11, a mobile transceiver 12, a display device 13, a microphone 14, a speaker 15, a character input device 16, a storage device 17, and a central processing unit (CPU) 20.

The Wi-Fi transceiver 11 performs wireless communication through the wireless LAN 3, such as a Wi-Fi network, using an antenna 10a. A Wi-Fi IP address is set in the Wi-Fi transceiver 11. For example, the Wi-Fi transceiver 11 establishes a connection to the Web server 1, using the IP address, and transmits and receives data.

The mobile transceiver 12 performs wireless communication through the mobile network 2, such as an LTE network, using an antenna 10b. An LTE IP address is set in the mobile transceiver 12. For example, the mobile transceiver 12 establishes a connection to the Web server 1, using the IP address, and transmits and receives data.

The display device 13 is, for example, a touch panel or a display and displays various kinds of information. The microphone 14 collects a voice and inputs the collected voice to the CPU 20. The speaker 15 outputs the voice input from the CPU 20.

The character input device 16 is, for example, a keyboard or a keyboard which is displayed on a touch panel, receives various inputs from the user, and outputs the inputs to the CPU 20. The storage device 17 is, for example, a memory or a hard disk and stores, for example, the programs executed by the CPU 20, the processing results which are generated by the programs executed by the CPU 20, and various tables.

The CPU 20 is a processing unit which is in charge of all of the processes of the mobile terminal 10. The CPU 20 reads a program from the storage device 17 and performs processes. For example, the CPU 20 operates a process that performs processing which will be described after FIG. 3. In addition, two or more CPUs 20 may be provided.

Functional Structure

Figures 3, 4:
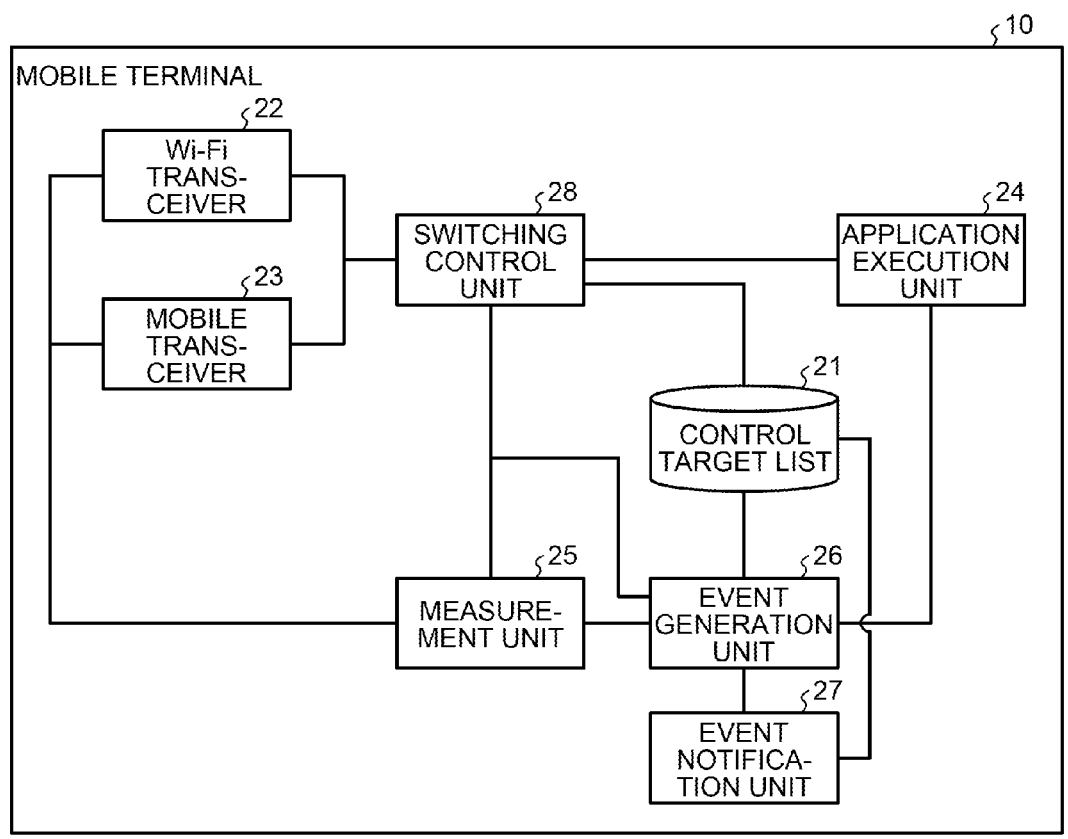
FIG. 3 is a functional block diagram illustrating the functional structure of the mobile terminal according to the first embodiment.
FIG. 4 is a diagram illustrating an example of information stored in a control target list.

FIG. 3 is a functional block diagram illustrating the functional structure of the mobile terminal according to the first embodiment. As illustrated in FIG. 3, the mobile terminal 10 includes a control target list 21, a Wi-Fi transceiver 22, a mobile transceiver 23, an application execution unit 24, a measurement unit 25, an event generation unit 26, an event notification unit 27, and a switching control unit 28.

The control target list 21 stores information about applications other than a simultaneous communication target. Specifically, the control target list 21 stores information about applications which use a limited communication network. For example, the control target list 21 stores information about applications which can use only by the Wi-Fi network.

FIG. 4 is a diagram illustrating an example of the information stored in the control target list. As illustrated in FIG. 4, the control target list 21 stores an "application name" and an "identifier (UID)" so as to be associated with each other. The stored "application name" is the name of the application which can use only by the Wi-Fi network and the identifier (UID) is an identifier for specifying the application. In the example illustrated in FIG. 4, as the identifier (UID), "W" is set to the application A.

The Wi-Fi transceiver 22 is a processing unit that generates sockets to be used for the Wi-Fi network and transmits and receives data using the Wi-Fi network. Specifically, the Wi-Fi transceiver 22 establishes a connection to the communication destination, such as the Web server 1, on the Wi-Fi network and transmits data to the communication destination using the socket.

For example, the Wi-Fi transceiver 22 writes data to the socket using the connection which is established with the communication destination such as the Web server 1. The data is read by the communication destination. The communication destination returns the request from the mobile terminal 10 and the mobile terminal 10 receives the data using the socket. When the communication between the mobile terminal 10 and the communication destination is completed, the Wi-Fi transceiver 22 closes the socket.

When the communication destination writes data to the socket, the Wi-Fi transceiver 22 reads the data from the socket, using the connection established with the communication destination. In this way, the Wi-Fi transceiver 22 transmits and receives data using Wi-Fi socket communication.

The mobile transceiver 23 is a processing unit that generates sockets to be used for the LTE network and transmits and receives data using the LTE network. Specifically, the mobile transceiver 23 establishes a connection to the communication destination, such as the Web server 1, on the LTE network and transmits data to the communication destination using the socket.

For example, the mobile transceiver 23 writes data to the socket using the connection established with the communication destination and the communication destination reads the data. The communication destination returns the request from the mobile terminal 10 and the mobile terminal 10 receives the data using the socket. When the communication between the mobile terminal 10 and the communication destination is completed, the mobile transceiver 23 closes the socket.

When the communication destination writes data to the socket, the mobile transceiver 23 reads the data from the socket, using the connection established with the communication destination. In this way, the mobile transceiver 23 transmits and receives data using LTE socket communication.

The application execution unit 24 is a processing unit that executes applications. Specifically, the application execution unit 24 reads an application program desired by the user from, for example, the storage device 17, develops the program in the memory, and executes the application, in response to an instruction from the user.

The measurement unit 25 is a processing unit that measures the radio quality of each communication network. Specifically, the measurement unit 25 measures, for example, the link speed of the mobile network 2 or the received signal strength indicator (RSSI) value of the wireless LAN 3. For example, the measurement unit 25 acquires, for example, the link speed from a mobile phone company which provides the mobile network 2 or the RSSI value from a wireless LAN access point at a predetermined interval of 2 minutes, and notifies the event generation unit 26 or the switching control unit 28 of the acquired information.

The event generation unit 26 is a processing unit that generates network information to be notified to the application, on the basis of the quality of each wireless communication network and the type of application. Specifically, the event generation unit 26 acquires the RSSI value of the Wi-Fi network or the link speed of the LTE network from the measurement unit 25. Then, when the mobile terminal is disconnected from the Wi-Fi network and is connected to the LTE network, the event generation unit 26 generates network information indicating that the LTE network is the available communication network. On the other hand, when the mobile terminal is simultaneously connected to the Wi-Fi network and the LTE network or when the mobile terminal is connected only to the Wi-Fi network, the event generation unit 26 generates network information indicating that the Wi-Fi network is the available communication network.

The event generation unit 26 generates an event which makes a limit target application, which is limited to use only by the Wi-Fi network, recognize that the mobile terminal is connected to the LTE network when communication is performed using both the Wi-Fi network and the LTE network and makes the limit target application recognize that the mobile terminal is connected to the Wi-Fi network when communication is performed using only the Wi-Fi network.

For example, when the mobile terminal is connected only to the LTE network, that is, when the allocation ratio of the sockets is Wi-Fi:LTE=0:10, the event generation unit 26 generates an event which makes all applications recognize that the mobile terminal is connected to the LTE network.

In an environment in which both the Wi-Fi network and the LTE network can be used and the quality of the Wi-Fi network is equal to or less than a threshold value, the event generation unit 26 generates an event corresponding to the type of application. That is, when the allocation ratio of the sockets is not Wi-Fi:LTE=0:10 or Wi-Fi:LTE=10:0, but is Wi-Fi:LTE=4:6 or Wi-Fi:LTE=5:5, the event generation unit 26 generates an event corresponding to the type of application. In this case, the event generation unit 26 generates an event which makes the application registered in the control target list 21 recognize that the mobile terminal is connected to the LTE network and generates an event which makes the other applications recognize that the mobile terminal is connected to the Wi-Fi network.

That is, when the quality of the Wi-Fi network is not high and the allocation ratio of the sockets to the Wi-Fi network is less than 80%, the event generation unit 26 determines that the Wi-Fi network is not stabilized and it is difficult to normally use the Wi-Fi network. Then, the event generation unit 26 pretends that communication is performed using the LTE network, in order to limit the operation of the application registered in the control target list 21, similarly to when the LTE network is used.

In an environment in which both the Wi-Fi network and the LTE network can be used and the quality of the Wi-Fi network is greater than the threshold value, the event generation unit 26 generates an event for the application which is limited in use. That is, when the allocation ratio of, for example, the sockets is Wi-Fi:LTE=10:0, the event generation unit 26 generates an event which makes the application registered in the control target list 21 recognize that the mobile terminal is connected to the Wi-Fi network. In this case, the event generation unit 26 suppresses the generation and notification of events for the application which is not limited in use, that is, the application which has not been registered in the control target list 21.

That is, when the quality of the Wi-Fi network is high and the allocation ratio of the sockets to the Wi-Fi network is equal to or greater than 80%, the event generation unit 26 determines that the Wi-Fi network is stabilized and it is possible to normally use the Wi-Fi network. Then, the event generation unit 26 notifies the application which is limited in use that communication is being performed using the Wi-Fi network, in order to release the limit of the operation of the application registered in the control target list 21. In addition, the event generation unit 26 can transmit a request to switch the communication mode to communication using only the Wi-Fi network to the switching control unit 28. In addition, the event is also generated in an environment in which the LTE network is not available and the Wi-Fi network is available.

Then, the event generation unit 26 outputs the generated event to the event notification unit 27. Here, various events used by the wireless communication terminal, such as broadcast intent, can be used as the generated event.

The event notification unit 27 is a processing unit that notifies the corresponding application of the event generated by the event generation unit 26. For example, the event notification unit 27 notifies all of the applications which are installed in the mobile terminal 10 of the event during LTE connection which is generated during LTE connection.

In addition, the event notification unit 27 notifies the application registered in the control target list 21 of the event which pretends that communication is performed using the LTE network. In addition, the event notification unit 27 notifies the application registered in the control target list 21 of the event which is generated in an environment in which both the Wi-Fi network and the LTE network can be used and the use rate of the Wi-Fi network is greater than a threshold value.

The switching control unit 28 is a processing unit that determines the allocation ratio of the sockets to each communication network on the basis of the quality of the Wi-Fi network and the quality of the LTE network measured by the measurement unit 25 and performs wireless communication at the determined allocation ratio. Then, the switching control unit 28 generates sockets in the Wi-Fi transceiver 22 or the mobile transceiver 23 at the determined allocation ratio, and transmits and receives data. It is preferable that the quality determination threshold value used by the switching control unit 28 be the same as the quality determination threshold value used by the event generation unit 26. In addition, the switching control unit 28 notifies the event generation unit 26 of the determined allocation ratio.

For example, when the Wi-Fi network is unavailable and the LTE network is available, the switching control unit 28 determines the allocation ratio of, for example, the sockets to be Wi-Fi:LTE=0:10. In this case, the switching control unit 28 allocates data which is output from all applications only to the mobile transceiver 23 and transmits the data to the destination.

When a connection to the Wi-Fi network and a connection to the LTE network are established and the quality of the Wi-Fi network is equal to or less than the threshold value, the switching control unit 28 determines that the allocation ratio of, for example, the sockets to be Wi-Fi:LTE=7:3. In this case, the switching control unit 28 determines that the Wi-Fi network is not stabilized and it is difficult to normally use the Wi-Fi network. As a result, the switching control unit 28 allocates data which is output from the applications registered in the control target list 21 to the mobile transceiver 23 and transmits the data to the destination. The switching control unit 28 allocates data output from the application which has not been registered in the control target list 21 to each communication network on the basis of the allocation ratio and transmits the data to the destination.

When a connection to the Wi-Fi network and a connection to the LTE network are established and the quality of the Wi-Fi network is greater than the threshold value, the switching control unit 28 determines that the allocation ratio of, for example, the sockets to be Wi-Fi:LTE=2:8. In this case, the switching control unit 28 determines that the Wi-Fi network is stabilized and it is possible to normally use the Wi-Fi network. The switching control unit 28 substantially sets the allocation ratio to Wi-Fi:LTE=10:0 and controls wireless communication. As a result, the switching control unit 28 allocates data which is output from all applications only to the Wi-Fi transceiver 22 and transmits the data to the destination.

When the Wi-Fi network is unavailable and the LTE network is available, the switching control unit 28 determines that the allocation ratio of, for example, the sockets to be Wi-Fi:LTE=10:0. In this case, the switching control unit 28 allocates data which is output from all applications only to the Wi-Fi transceiver 22 and transmits the data to the destination.

For example, a table can be used to determine the allocation ratio on the basis of radio quality. For example, the switching control unit 28 can determine the allocation ratio on the basis of radio quality, using a table for uniquely determining the allocation ratio from the RSSI value of the Wi-Fi network and the link speed of the LTE network.

When a connection to the Wi-Fi network and a connection to the LTE network are established and the state in which the quality of the Wi-Fi network is greater than the threshold value is maintained for a predetermined period of time, the switching control unit 28 determines that the Wi-Fi network is stabilized and it is possible to normally use the Wi-Fi network. Similarly, when a connection to the Wi-Fi network and a connection to the LTE network are established and the state in which the quality of the Wi-Fi network is equal to or less than the threshold value is maintained for a predetermined period of time, the switching control unit 28 determines that the Wi-Fi network is not stabilized and it is difficult to normally use the Wi-Fi network. This determination process makes it possible to suppress a reduction in communication efficiency due to frequent switching control. This method can also be applied to the event generation unit 26.

Description of Generation of Event

Figure 5:
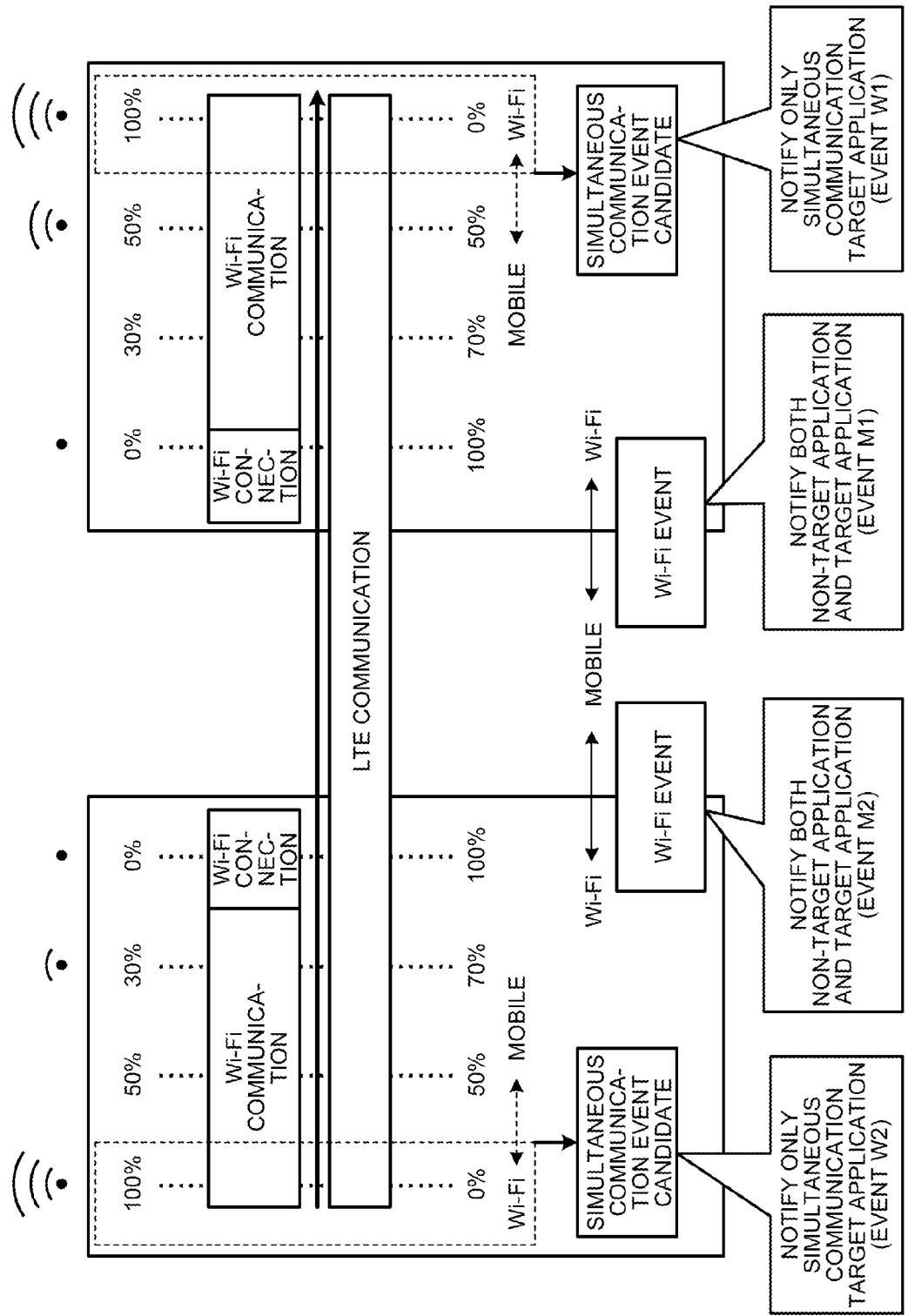
FIG. 5 is a diagram illustrating the occurrence of an event notification.

FIG. 5 is a diagram illustrating the generation of an event notification. FIG. 5 illustrates the lapse of time from the left to the right. First, the mobile terminal 10 establishes a connection to the Wi-Fi network and a connection to the LTE network and the state in which the quality of the Wi-Fi network is greater than a threshold value A is maintained for a predetermined period of time. Therefore, wireless communication is performed using only the Wi-Fi network.

In this state, when the quality of the Wi-Fi network is maintained at the level that is equal to or less than the threshold value A, the mobile terminal 10 performs wireless communication using the Wi-Fi network and the LTE network at the same time. In this case, the mobile terminal 10 generates a simultaneous communication event candidate (event W2) and notifies the corresponding application of the generated simultaneous communication event candidate. Specifically, the mobile terminal 10 notifies the application registered in the control target list 21 that wireless communication is being performed using the LTE network and limits the operation of the application to be controlled.

When the radio quality of the Wi-Fi network is equal to or less than a threshold value B (the threshold value A>the threshold value B) or is unavailable, the mobile terminal 10 performs wireless communication using only the LTE network. In this case, the mobile terminal 10 generates a Wi-Fi event (event M2) and notifies the corresponding application of the generated Wi-Fi event. Specifically, the mobile terminal 10 notifies the application installed in the mobile terminal 10 that wireless communication is being performed using the LTE network.

Then, when a connection to the Wi-Fi network and a connection to the LTE network are established and the quality of the Wi-Fi network is greater than the threshold value B, the mobile terminal 10 performs wireless communication using the Wi-Fi network and the LTE network at the same time. In this case, the mobile terminal 10 generates a Wi-Fi event (event M1) and notifies the corresponding application of the generated Wi-Fi event. Specifically, the mobile terminal 10 notifies the application registered in the control target list 21 that wireless communication is being performed using the LTE network and notifies the other applications that wireless communication is being performed using the Wi-Fi network.

In this state, when the quality of the Wi-Fi network is maintained at the level that is greater than the threshold value A for a predetermined period of time, the mobile terminal 10 performs wireless communication using only the Wi-Fi network. In this case, the mobile terminal 10 generates a simultaneous communication event candidate (event W1) and notifies the corresponding application of the generated simultaneous communication event candidate. Specifically, the mobile terminal 10 notifies the application registered in the control target list 21 that wireless communication is being performed using the Wi-Fi network.

Example of Control of Event Notification

Figure 6:
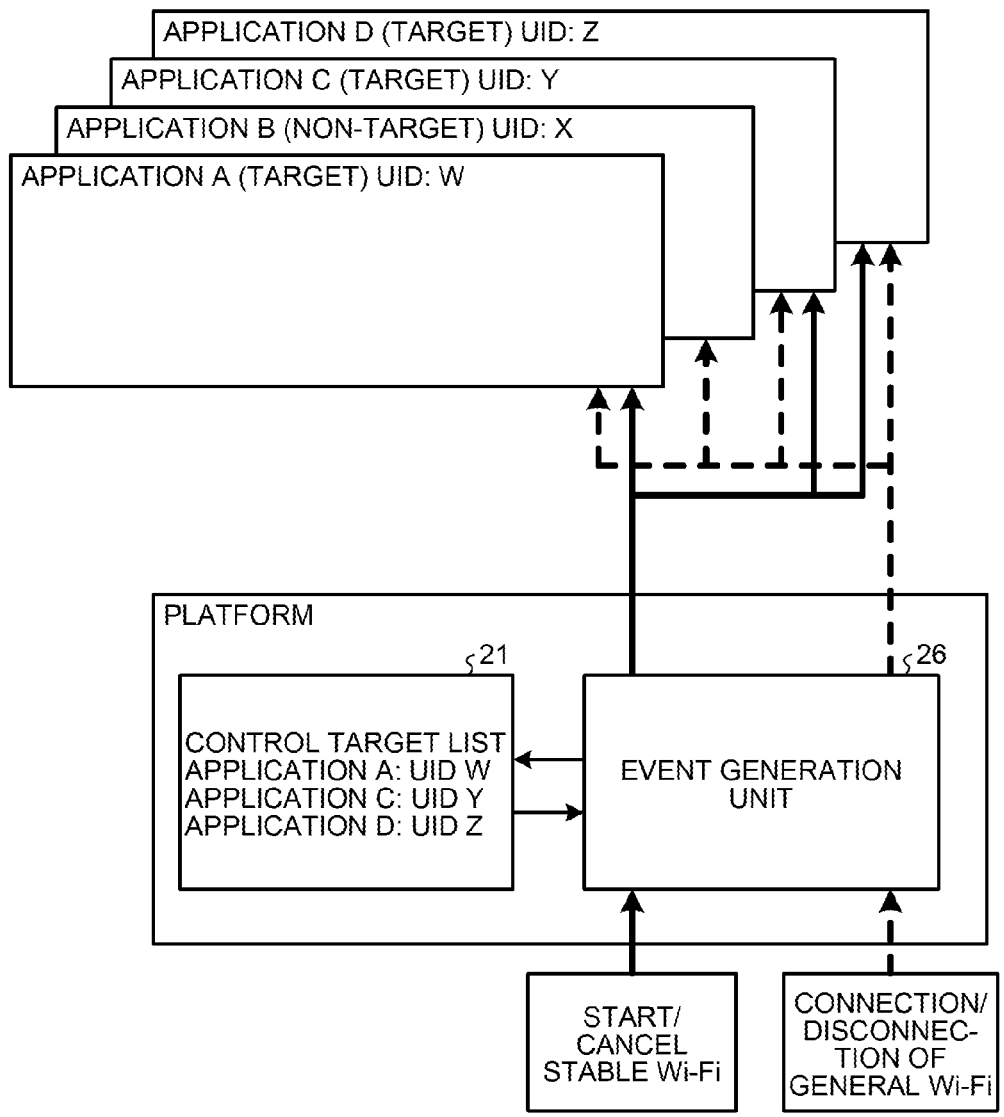
FIG. 6 is a diagram illustrating an example of the control of the event notification.

FIG. 6 is a diagram illustrating an example of the control of an event notification. As illustrated in FIG. 6, when it is detected that stable Wi-Fi communication starts or that stable Wi-Fi communication is cancelled, the event generation unit 26 of the mobile terminal 10 generates simultaneous communication event candidates in the applications A, C, and D to be controlled which are registered in the control target list 21.

When it is detected that general Wi-Fi communication starts or that general Wi-Fi communication is cancelled, the event generation unit 26 of the mobile terminal 10 generates each Wi-Fi event in each application.

Example of Communication Allocation Control

Figure 7:
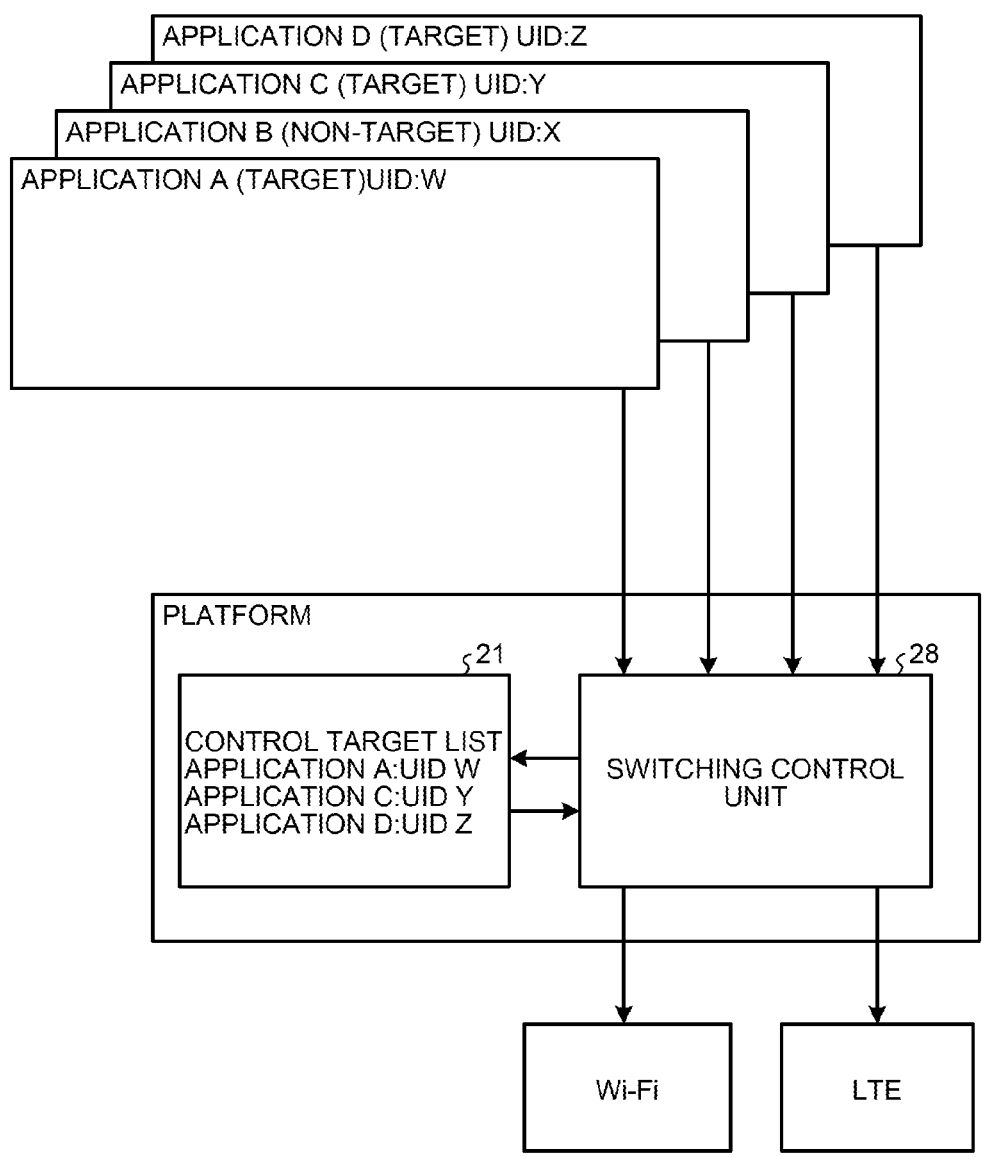
FIG. 7 is a diagram illustrating an example of the allocation of communication from an application.

FIG. 7 is a diagram illustrating an example of the allocation of communication from an application. FIG. 7 illustrates an example in which communication is performed using the Wi-Fi network and the LTE network at the same time.

The switching control unit 28 of the mobile terminal 10 transmits data output from the applications A, C, and D to the destination using the LTE network, regardless of the allocation ratio since the applications A, C, and D have been registered in the control target list 21. In contrast, the switching control unit 28 of the mobile terminal 10 transmits data output from the application B to the destination on the basis of the allocation ratio, using both the LTE network and the Wi-Fi network, since the application B has not been registered in the control target list 21.

Flow of Process

Next, the flow of each process performed by the mobile terminal 10 will be described. Here, an event generation determination process, a simultaneous communication event notification process, and a Wi-Fi event notification process will be described.

Event Generation Determination Process

Figure 8:
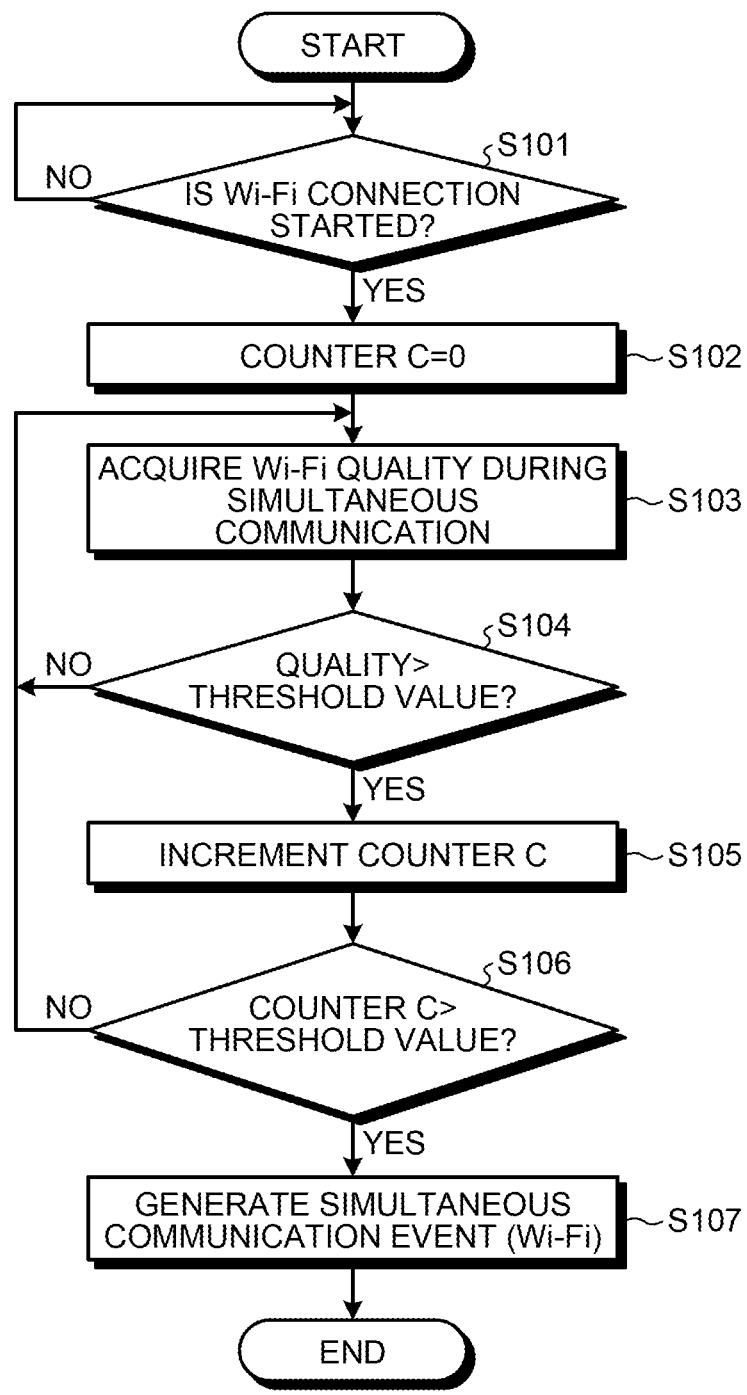
FIG. 8 is a flowchart illustrating the flow of an event generation determination process.

FIG. 8 is a flowchart illustrating the flow of the event generation determination process. As illustrated in FIG. 8, when a connection to the Wi-Fi network starts (Step S101: Yes), the switching control unit 28 sets a value of 0 to a counter C (Step S102).

Then, the measurement unit 25 periodically acquires the quality of the Wi-Fi network during simultaneous communication (Step S103). The switching control unit 28 determines whether the acquired quality of the Wi-Fi network is greater than a threshold value (Step S104).

Then, when the quality of the Wi-Fi network is greater than the threshold value (Step S104: Yes), the switching control unit 28 increments the counter C (Step S105). On the other hand, when the quality of the Wi-Fi network is equal to or less than the threshold value (Step S104: No), the switching control unit 28 repeats Step S103 and the subsequent steps.

Then, when the counter C is greater than a threshold value (Step S106: Yes), the switching control unit 28 determines that a simultaneous communication event has been generated (Step S107). As a result, the switching control unit 28 sets the allocation ratio of the sockets to the Wi-Fi network to 100% and changes the communication mode to communication using only the Wi-Fi network. The event generation unit 26 generates an event W1 corresponding to the simultaneous communication event candidate described with reference to FIG. 5. In addition, the switching control unit 28 can notify the event generation unit 26 of the generation of the simultaneous event.

On the other hand, when the counter C is not greater than the threshold value (Step S106: No), the switching control unit 28 repeats Step S103 and the subsequent steps. In addition, when the allocation ratio of the sockets to the Wi-Fi network is set to 0% and the communication mode is switched to communication using only the LTE network, the switching control unit 28 can perform the process using the same method as that described above.

Process of Notifying Event M1

Figure 9:
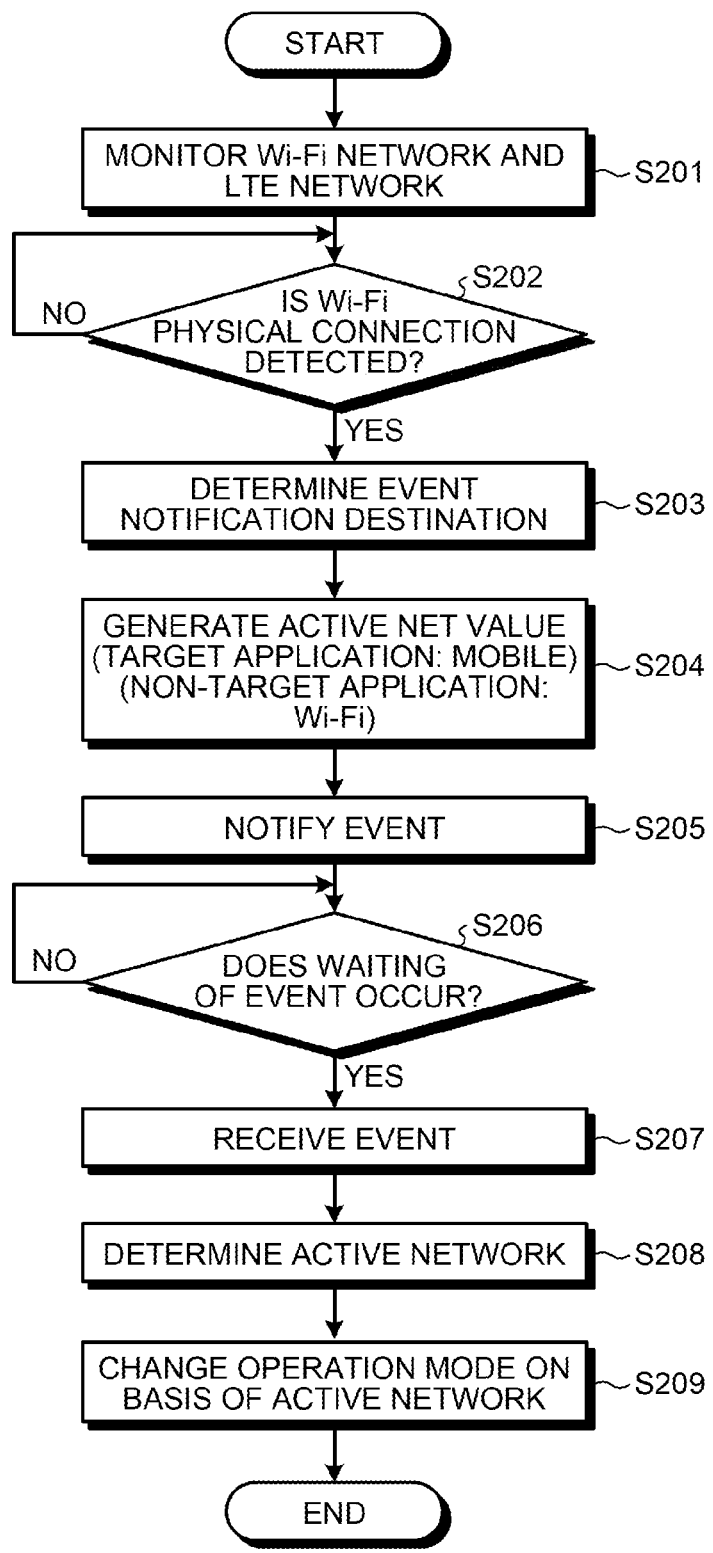
FIG. 9 is a flowchart illustrating the flow of a process of notifying an event M1.

FIG. 9 is a flowchart illustrating the flow of a process of notifying the event M1. This process is a process of transmitting the event M1 which is the Wi-Fi event described with reference to FIG. 5.

As illustrated in FIG. 9, the event generation unit 26 monitors the Wi-Fi network and the LTE network through the measurement unit 25 (Step S201). When a physical connection to the Wi-Fi network is detected (Step S202: Yes), the event generation unit 26 determines an event notification destination (Step S203). Specifically, the event generation unit 26 specifies the application to be controlled, with reference to the control target list 21.

Then, the event generation unit 26 generates the event M1 corresponding to the type of application (Step S204). Specifically, the event generation unit 26 generates an event M1 having "mobile" as an active net value for a target application registered in the control target list and generates an event M1 having "Wi-Fi" as the active net value for the other non-target applications. Then, the event notification unit 27 transmits the generated events M1 to the corresponding applications (Step S205).

The application installed in the mobile terminal 10 suppresses the reception of the event transmitted from the platform of the mobile terminal 10 until the waiting of the event occurs (Step S206).

Then, when the waiting of the event occurs (Step S206: Yes), the application receives the event M1 transmitted from the event notification unit 27 which is the platform of the mobile terminal 10 (Step S207).

Then, the application determines an active network on the basis of the active net value set to the received event M1 (Step S208). Specifically, the application determines that the network set to the active net value is being used.

Then, the application changes the operation mode on the basis of the determined active network and starts communication (Step S209). For example, the non-target application performs the function which can be used by the Wi-Fi network since the active net value is "Wi-Fi" and the target application suppresses the execution of the function which can be used by the Wi-Fi network since the active net value is "mobile".

Process of Notifying Event W1

Figure 10:
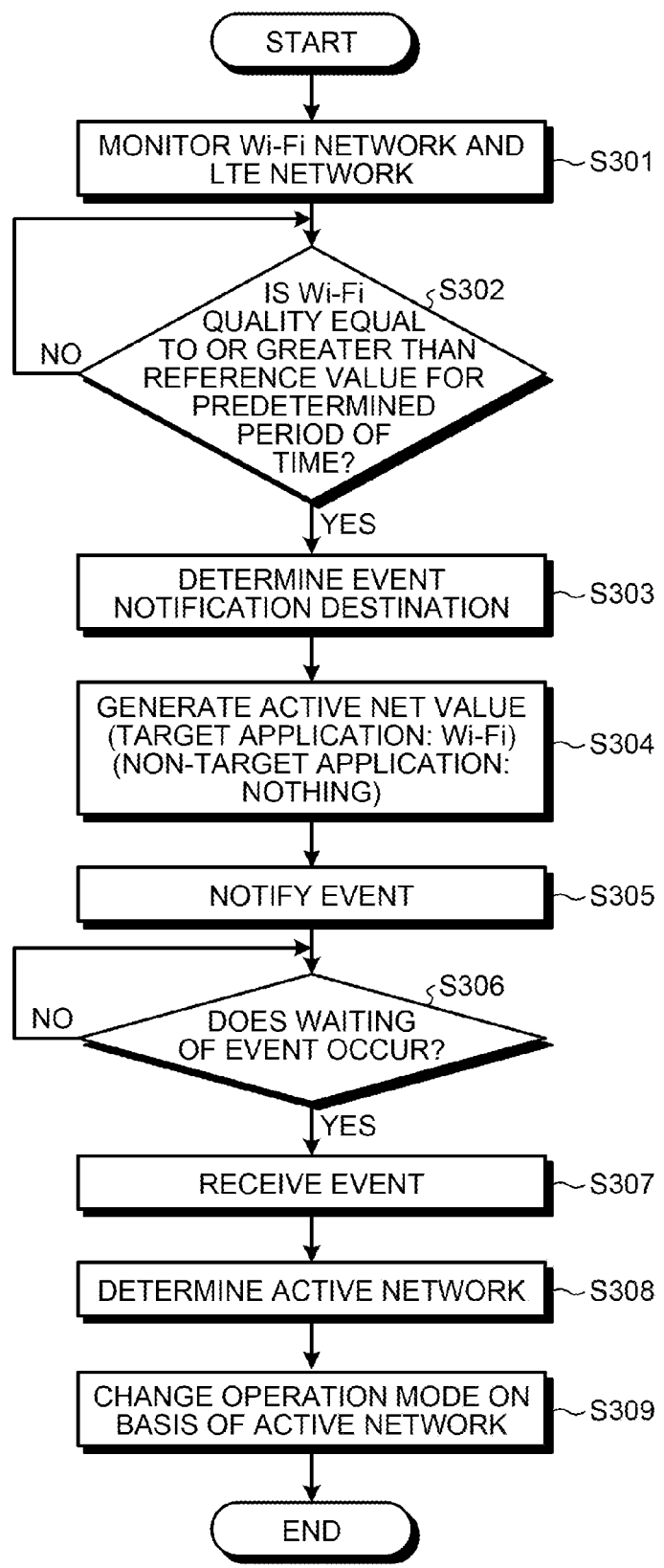
FIG. 10 is a flowchart illustrating the flow of a process of notifying an event W1.

FIG. 10 is a flowchart illustrating the flow of a process of notifying the event W1. This process is a process of transmitting the event W1 which is the simultaneous communication event candidate described with reference to FIG. 5.

As illustrated in FIG. 10, the event generation unit 26 monitors the Wi-Fi network and the LTE network through the measurement unit 25 (Step S301). When it is detected that the quality of the Wi-Fi is equal to or greater than a reference value for a predetermined period of time (Step S302: Yes), the event generation unit 26 determines an event notification destination (Step S303).

Then, the event generation unit 26 generates the event W1 corresponding to the type of application (Step S304). Specifically, the event generation unit 26 generates an event W1 having "Wi-Fi" as the active net value for a target application registered in the control target list and suppresses the generation of the event W1 for the other non-target applications. Then, the event notification unit 27 transmits the generated event W1 to the corresponding application (Step S305).

The application installed in the mobile terminal 10 suppresses the reception of the event transmitted from the platform of the mobile terminal 10 until the waiting of the event occurs (Step S306).

Then, when the waiting of the event occurs (Step S306: Yes), the application receives the event W1 transmitted from the event notification unit 27 which is the platform of the mobile terminal 10 (Step S307).

Then, the application determines an active network on the basis of the active net value set to the received event W1 (Step S308). Specifically, the application determines that the network set to the active net value is being used.

Then, the application changes the operation mode on the basis of the determined active network and starts communication (Step S309). For example, the target application performs the function which can be used by the Wi-Fi network since the active net value is "Wi-Fi".

Process of Notifying Event W2

Figure 11:
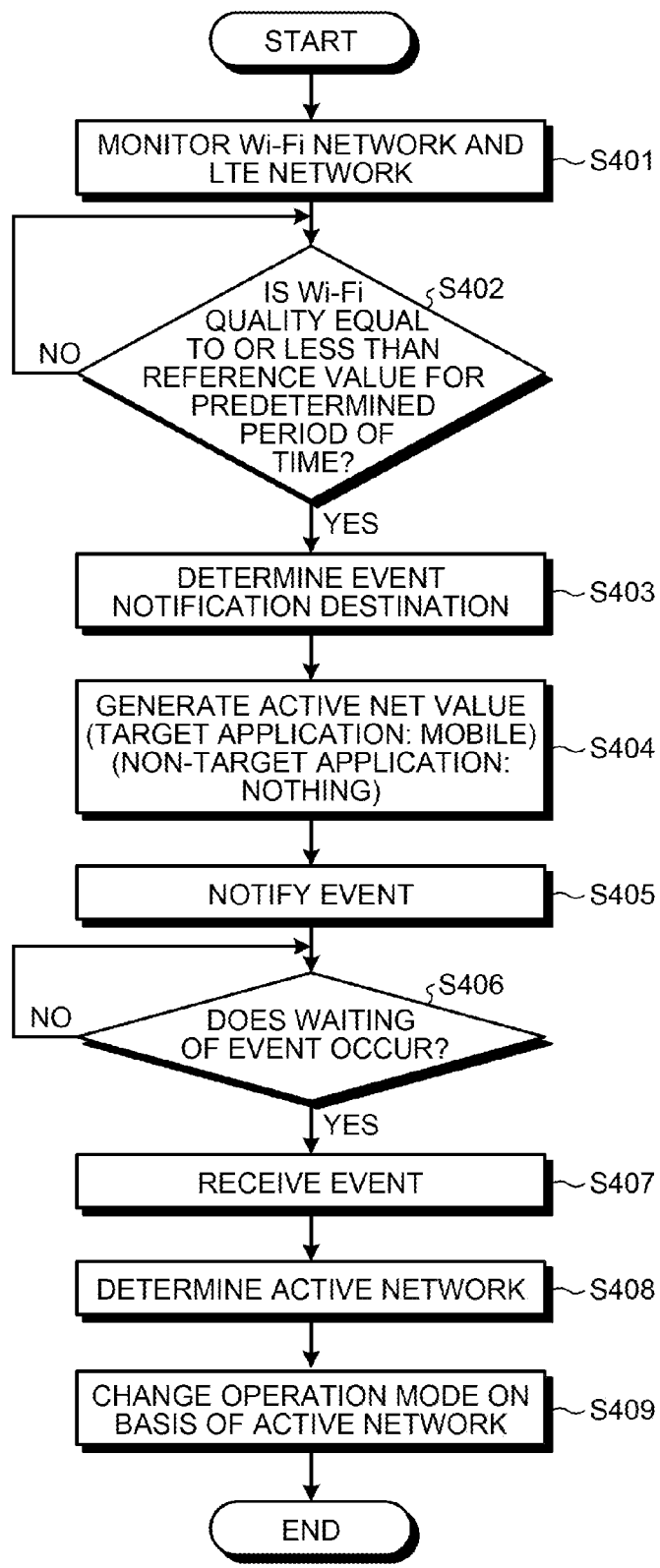
FIG. 11 is a flowchart illustrating the flow of a process of notifying an event W2.

FIG. 11 is a flowchart illustrating the flow of a process of notifying the event W2. This process is a process of transmitting the event W2 which is the simultaneous communication event candidate described with reference to FIG. 5.

As illustrated in FIG. 11, the event generation unit 26 monitors the Wi-Fi network and the LTE network through the measurement unit 25 (Step S401). When it is detected that the quality of the Wi-Fi is equal to or less than a reference value for a predetermined period of time (Step S402: Yes), the event generation unit 26 determines an event notification destination (Step S403).

Then, the event generation unit 26 generates the event W2 corresponding to the type of application (Step S404). Specifically, the event generation unit 26 generates an event W1 having "Mobile" as the active net value for a target application registered in the control target list and suppresses the generation of the event W2 for the other non-target applications. Then, the event notification unit 27 transmits the generated event W2 to the corresponding application (Step S405).

The application installed in the mobile terminal 10 suppresses the reception of the event transmitted from the platform of the mobile terminal 10 until the waiting of the event occurs (Step S406).

Then, when the waiting of the event occurs (Step S406: Yes), the application receives the event W2 transmitted from the event notification unit 27 (Step S407).

Then, the application determines an active network on the basis of the active net value set to the received event W2 (Step S408). Specifically, the application determines that the network set to the active net value is being used.

Then, the application changes the operation mode on the basis of the determined active network and starts communication (Step S409). For example, the target application suppresses the execution of the function which can be used by the Wi-Fi network since the active net value is "Mobile".

Process of Notifying Event M2

Figure 12:
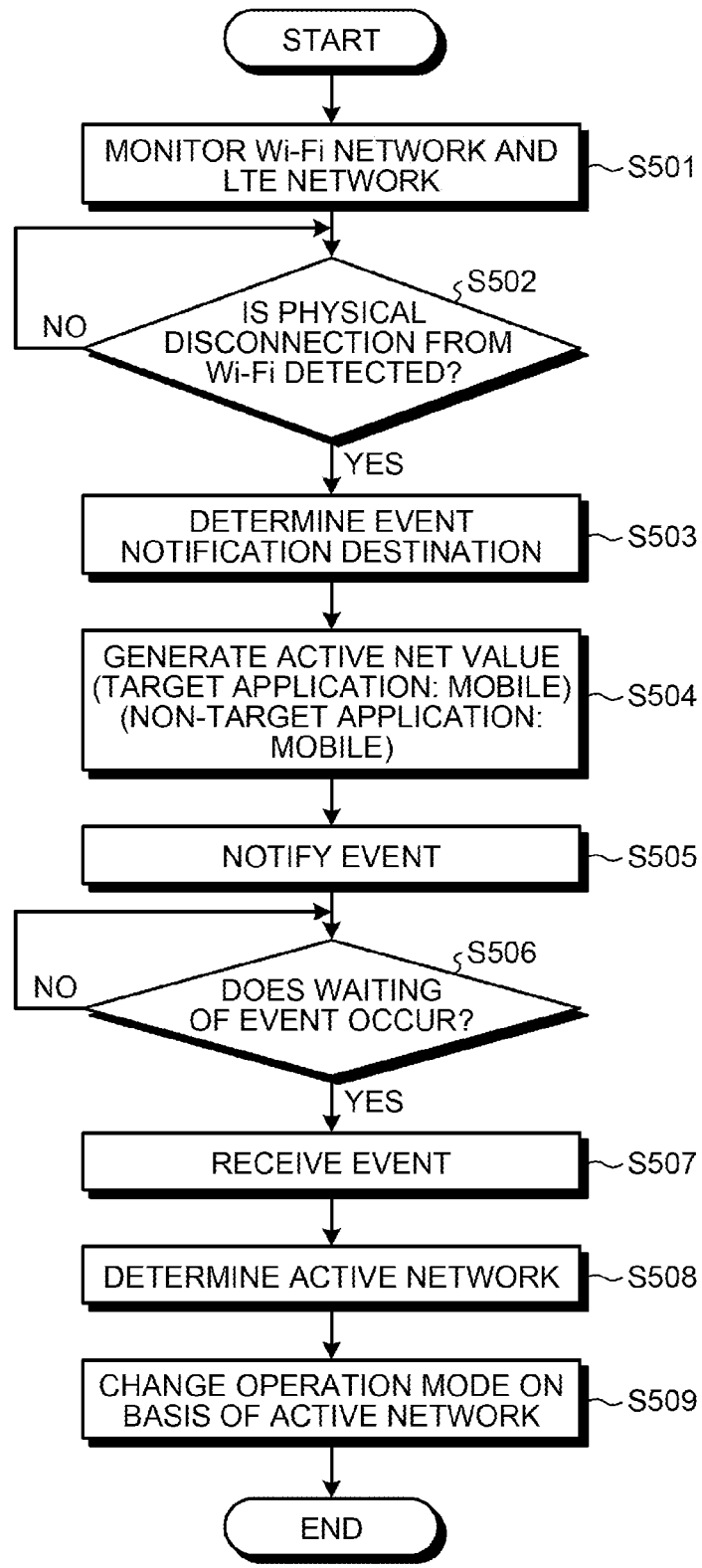
FIG. 12 is a flowchart illustrating the flow of a process of notifying an event M2.

FIG. 12 is a flowchart illustrating the flow of a process of notifying the event M2. This process is a process of transmitting the event M2 which is the Wi-Fi event described with reference to FIG. 5.

As illustrated in FIG. 12, the event generation unit 26 monitors the Wi-Fi network and the LTE network through the measurement unit 25 (Step S501). When a physical disconnection from the Wi-Fi network is detected (Step S502: Yes), the event generation unit 26 determines an event notification destination (Step S503).

Then, the event generation unit 26 generates the event M2 corresponding to the type of application (Step S504). Specifically, the event generation unit 26 generates an event M2 having "mobile" as the active net value for a target application registered in the control target list and the other applications. Then, the event notification unit 27 transmits the generated event M2 to all applications (Step S505).

The application installed in the mobile terminal 10 suppresses the reception of the event until the waiting of the event occurs (Step S506). Then, when the waiting of the event occurs (Step S506: Yes), the application receives the event M2 transmitted from the event notification unit 27 (Step S507).

Then, the application determines an active network on the basis of the active net value set to the received event M2 (Step S508). Specifically, the application determines that the network set to the active net value is being used.

Then, the application changes the operation mode on the basis of the determined active network and starts communication (Step S509). For example, all applications suppress the execution of the function which can be used by the Wi-Fi network since the active net value is "Mobile".

Effect

As such, while communication is performed using the Wi-Fi network and the LTE network at the same time, the mobile terminal 10 can make the application, which is limited in use, recognize that LTE communication is being performed and can notify the application, which is not limited in use, that Wi-Fi communication is being performed.

As a result, for example, while communication is performed using the Wi-Fi network and the LTE network at the same time, the browser application performs only the functions corresponding to the LTE network and does not perform a preload function which can be used only by the Wi-Fi network. Therefore, the mobile terminal 10 can prevent, for example, the occurrence of an unnecessary charge caused by simultaneous communication and can prevent the occurrence of an operation error in the application.

In addition, it is possible to prevent the occurrence of an operation error in, for example, an application which controls encryption in the Wi-Fi network and the LTE network. For example, the application generally transmits packets in a secure mobile network (cellular network), without any change because of a security problem. In Wi-Fi communication, the application performs a special security process and then performs packet communication, in order to strengthen security. In this case, the mobile terminal 10 can prevent an unencrypted packet from being transmitted through the Wi-Fi network.

When the quality of the Wi-Fi network is stabilized, the mobile terminal 10 can switch the communication mode to communication using only the Wi-Fi network and can notify the application which is limited in use that the Wi-Fi network is being used. Therefore, the mobile terminal 10 can stably use communication after wireless communication is switched and can suppress an increase in load due to frequency switching.

When only an LTE connection is available, the mobile terminal 10 can switch the communication mode to communication using only the LTE network and can notify all applications that the LTE network is used. Therefore, the mobile terminal 10 can suppress the execution of the function which can be used only by the Wi-Fi network or the application which can be used only by the Wi-Fi network.

[b] Second Embodiment

The first embodiment of the invention has been described above. However, the invention is not limited to the above-described embodiment, but various modifications and changes of the invention can be made.

Request from Application

In the above-described embodiment, the platform of the mobile terminal 10 notifies the application of the event. However, the invention is not limited thereto. For example, when the application requests the platform to transmit an event and the platform receives the request, it is possible to generate and notify the event.

Allocation of Communication Network

In the above-described embodiment, the mobile terminal 10 allocates the sockets to the communication networks. However, the invention is not limited thereto. For example, the mobile terminal 10 can perform allocation control in an arbitrary unit, such as the unit of packets.

Structure of System and Others

Each structure of the apparatus illustrated in the drawings is not always the physical structure illustrated in the drawings. That is, the components can be dispersed or integrated in an arbitrary unit. In addition, all or some of the processing functions of each apparatus can be implemented by a CPU and the program which is analyzed and executed by the CPU or they can be implemented as hardware by a wired logic.

In addition, among the processes described in this embodiment, all or some of the processes that are automatically performed may be manually performed. Alternatively, all or some of the processes that are manually performed may be automatically performed by a known method. The processing procedure, the control procedure, the specific names, and information including various kinds of data and parameters which are described in the specification and the drawings may be arbitrarily changed unless otherwise specified.

The mobile terminal 10 described in this embodiment can read a wireless communication control program and execute the wireless communication control program to implement the same functions as those in the process described with reference to, for example, FIG. 3. For example, the mobile terminal 10 develops, in the memory, a program which has the same functions as the Wi-Fi transceiver 22, the mobile transceiver 23, the application execution unit 24, the measurement unit 25, the event generation unit 26, the event notification unit 27, and the switching control unit 28. Then, the mobile terminal 10 executes the program which implements the same processes as the Wi-Fi transceiver 22, the mobile transceiver 23, the application execution unit 24, the measurement unit 25, the event generation unit 26, the event notification unit 27, and the switching control unit 28 to perform the same processes as those in the above-described embodiment.

The program can be distributed through a network such as the Internet. In addition, the program can be recorded on a computer-readable recording medium, such as a hard disk, a flexible disk (FD), a CD-ROM, an MO, or a DVD and the computer can read the program from the recording medium and execute the program.

According to the embodiment, it is possible to prevent the occurrence of an operation error in an application.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
   a memory; and
   a processor that is connected to the memory, wherein the processor executes a process including:
   specifying, whether or not an application is a limit target application, whose function that can be used by a first communication network cannot be used by a second communication network,
   determining, while data is transmitted through both of the first communication network and the second communication network at the same time and wireless communication is executed, the first communication network or the second communication network to be a communication network available for the application specified at the specifying, on the basis of the radio quality of the first communication network, the radio quality of the second communication network, and whether or not the application is the limit target application; and
   notifying the application of network information to make the application recognize that the mobile terminal is connected to the available communication network determined at the determining.

2. The wireless communication apparatus according to claim 1,
   wherein the determining includes, when the radio quality of the first communication network is equal to or greater than a first threshold value and is less than a second threshold value, determining that the first communication network to be the available communication network for an application other than the limit target application specified at the specifying, and determining that the second communication network is the available communication network for the limit target application specified at the specifying, and
   transmitting the network information for specifying the first communication network to the application other than the limit target application and transmitting the network information for specifying the second communication network to the limit target application.

3. The wireless communication apparatus according to claim 2,
   wherein the determining includes, when the radio quality of the first communication network is equal to or greater than the second threshold value, determining that the first communication network is the available communication network for the limit target application, and
   the notifying includes transmitting the network information for specifying the first communication network to the limit target application and suppressing the transmission of the network information to the application other than the limit target application.

4. The wireless communication apparatus according to claim 3,
   wherein the determining includes, when the radio quality of the first communication network is maintained at a level that is equal to or greater than the second threshold value for a predetermined period of time, determining that the first communication network is the available communication network for the limit target application.

5. The wireless communication apparatus according to claim 2,
   wherein the determining includes, when the radio quality of the first communication network is less than the first threshold value, determining that the second communication network is the available communication network for the limit target application and the application other than the limit target application, and
   the notifying includes transmitting the network information for specifying the second communication network to the limit target application and the application other than the limit target application.

6. The wireless communication apparatus according to claim 5,
   wherein the determining includes, when the radio quality of the first communication network is maintained at a level that is less than the first threshold value for a predetermined period of time, determining that the second communication network is the available communication network for the limit target application and the application other than the limit target application.

7. A wireless communication method comprising:
   specifying, whether or not an application is a limit target application, whose function that can be used by a first communication network cannot be used by a second communication network;
   determining, while data is transmitted through both of the first communication network and the second communication network at the same time and wireless communication is executed, the first communication network or the second communication network to be a communication network available for the specified application, on the basis of the radio quality of the first communication network, the radio quality of the second communication network, and whether or not the application is the limited target application, and
   notifying the application of network information to make the application recognize that the mobile terminal is connected to the determined available communication network.

8. A non-transitory computer-readable recording medium having stored a wireless communication program causing a computer to execute a process comprising:
   specifying, whether or not an application is a limit target application, whose function that can be used by a first communication network cannot be used by a second communication network;
   determining, while data is transmitted through both of the first communication network and the second communication network at the same time and wireless communication is executed, the first communication network or the second communication network to be a communication network available for the specified application, on the basis of the radio quality of the first communication network, the radio quality of the second communication network, and whether or not the application is the limited target application; and notifying the application of network information to make the application recognize that the mobile terminal is connected to the determined available communication network.

* * * * *